Nov. 18, 1930.                P. H. FRANK                1,781,685
                             SHAFT INCLOSURE
                            Filed Feb. 8, 1929

INVENTOR
HIS ATTORNEYS

Patented Nov. 18, 1930

1,781,685

UNITED STATES PATENT OFFICE

PARDEE H. FRANK, OF CANTON, OHIO, ASSIGNOR TO THE TIMKEN ROLLER BEARING COMPANY, OF CANTON, OHIO, A CORPORATION OF OHIO

SHAFT INCLOSURE

Application filed February 8, 1929. Serial No. 338,581.

This invention relates to oil containing shaft bearings and has for its principal object to prevent the entry of dirt and water or other foreign matter into and the escape of oil from such bearings through the shaft receiving openings thereof. Other objects are simplicity and cheapness of construction, compactness of design, fewness of parts, and to provide for the ready removal and replacement of parts that are subject to wear.

The invention consists principally in interposing between the shaft and the inner and outer ends of the shaft receiving opening in the bearing case reversely wound helical coils adapted to prevent the escape of oil from said casing through the shaft receiving opening thereof and the entry of water, dust or other foreign matter into said casing through said opening. The invention also consists in the parts and in the combinations and arrangements of parts hereinafter described and claimed.

Figure 1:
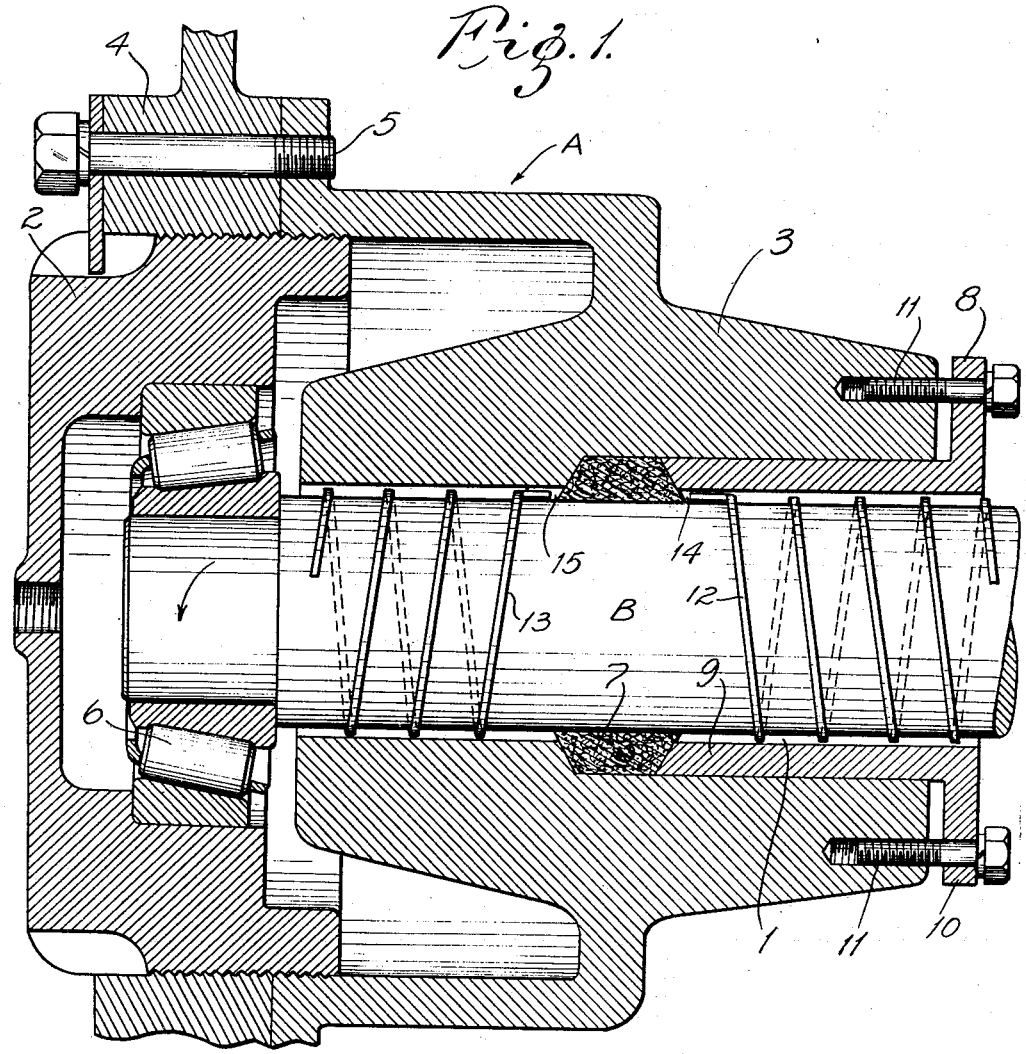
Figure 2:
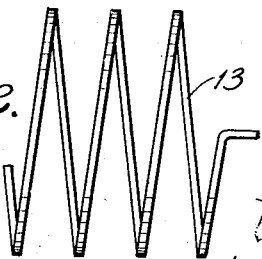

In the accompanying drawing, which forms part of this specification and wherein like symbols refer to like parts wherever they occur, Fig. 1 is a longitudinal sectional view of an oil containing shaft bearing embodying my invention; and Fig. 2 is a side elevation of one of the helical coils shown in Fig. 1.

Referring to the accompanying drawing, my invention is shown in connection with a shaft bearing comprising a hollow oil containing bearing casing A, and a shaft B which extends through a circular opening 1 provided therefor in one wall of said bearing casing. The bearing casing A preferably comprises a cup-shaped main body portion 2 which is closed by means of a cup-shaped closure member 3 threaded on said main body member. The main body member 2 of the hollow bearing casing A is mounted in an opening provided therefor in a standard or framework 4; and the closure member 3 is secured to the side of said framework by means of cap screws 5. As shown in the drawing, the shaft receiving opening 1 of the hollow bearing casing A is located in the closure member 3; and the shaft B projects through said opening and is preferably supported independently thereof by means of a conical roller bearing 6 mounted in the main body portion 2 of said casing.

Seated in the shaft receiving opening 1, midway between the ends thereof, is a packing ring 7, which snugly fits the shaft B. A suitable packing gland 8 has a hollow cylindrical body portion 9 interposed between an enlarged outer end portion of the shaft receiving opening 1 with its inner end bearing against the packing ring 7. The outer end of the cylindrical body portion 9 of the packing gland 8 is provided with a circumferential flange 10; and screws 11 extend through said flange and are threaded into the closure member 3 for forcing said packing gland against the packing ring 7.

Interposed between the shaft B and the packing gland 8 at the outer end of the shaft receiving opening 1 is a helically wound wire coil 12; and interposed between said shaft and the inner end of said opening is another helically wound wire coil, both coils snugly fitting said shaft. The outer coil 12 is held against rotation by inserting the inner end thereof in a notch or recess 14 provided therefor in the shaft receiving opening of the packing gland 8; and, likewise, the inner coil 13 is held against rotation by inserting the outer end thereof in a notch or seat 15 provided therefor in the shaft receiving opening 1. As shown in the drawing, the coils 12 and 13 are wound in reverse directions; that is, the outer coil 11 is wound in the form of a right-hand helix, and the inner coil 13 is wound in the form of a left-hand helix. Assuming that the shaft rotates in the direction indicated by the arrow in Fig. 1, the right-hand helical coil 12 will be located in the outer end of the shaft receiving opening 1 between the shaft B and the packing gland 8; and the left-hand helical coil 13 will be located in the inner end of said shaft receiving opening. With the right and left-hand helical coils 12 and 13, respectively, thus arranged in the shaft receiving opening 1 and with the shaft B rotating in the direction indicated by the arrow in Fig. 1, the two reversely wound coils act after the manner of right and left-hand screw conveyors, the outer coil 12 operating to prevent water, dust or other foreign matter from entering the outer end of the shaft opening, and the inner coil 13 operating to prevent oil in the casing from entering the inner end of said opening.

It is noted that by reason of the simplicity of my device, it is relatively inexpensive to make, reliable in operation, and strong enough to resist severe conditions of practical service. It is also noted as an important advantage of my invention that the coils are separate from the shaft opening and are thus adapted for ready replacement in the event they become worn or damaged.

Obviously, the construction hereinbefore described admits of considerable modification without departing from my invention; and the invention is applicable to shaft bearings or closures of various types.

What I claim is:

1. The combination with a rotating shaft, of an oil containing bearing casing comprising a main oil containing body portion and a closure member therefor having an opening adapted to receive said shaft, and two reversely wound helical coils surrounding said shaft one at the inner and the other at the outer end of the opening in said closure member.

2. The combination with a rotating shaft, of an oil containing bearing casing comprising a main oil containing body portion and a closure member therefor having an opening adapted to receive said shaft, and two reversely wound helical coils interposed between said shaft and said opening at the outer and inner ends thereof, said coils snugly fitting said shaft and being secured in said opening against rotation.

3. The combination with a rotating shaft, of an oil containing bearing casing comprising a main body member and a closure member therefor having an opening adapted to receive said shaft, a packing ring located in said opening intermediate the ends thereof, a packing gland in one end of said opening and cooperating with said ring, two reversely wound helical coils located one in each end of said opening and snugly fitting said shaft, and means for preventing said coils from rotating with said shaft.

Signed at Canton, Ohio, this 5th day of February 1929.

PARDEE H. FRANK.